Figure 1:
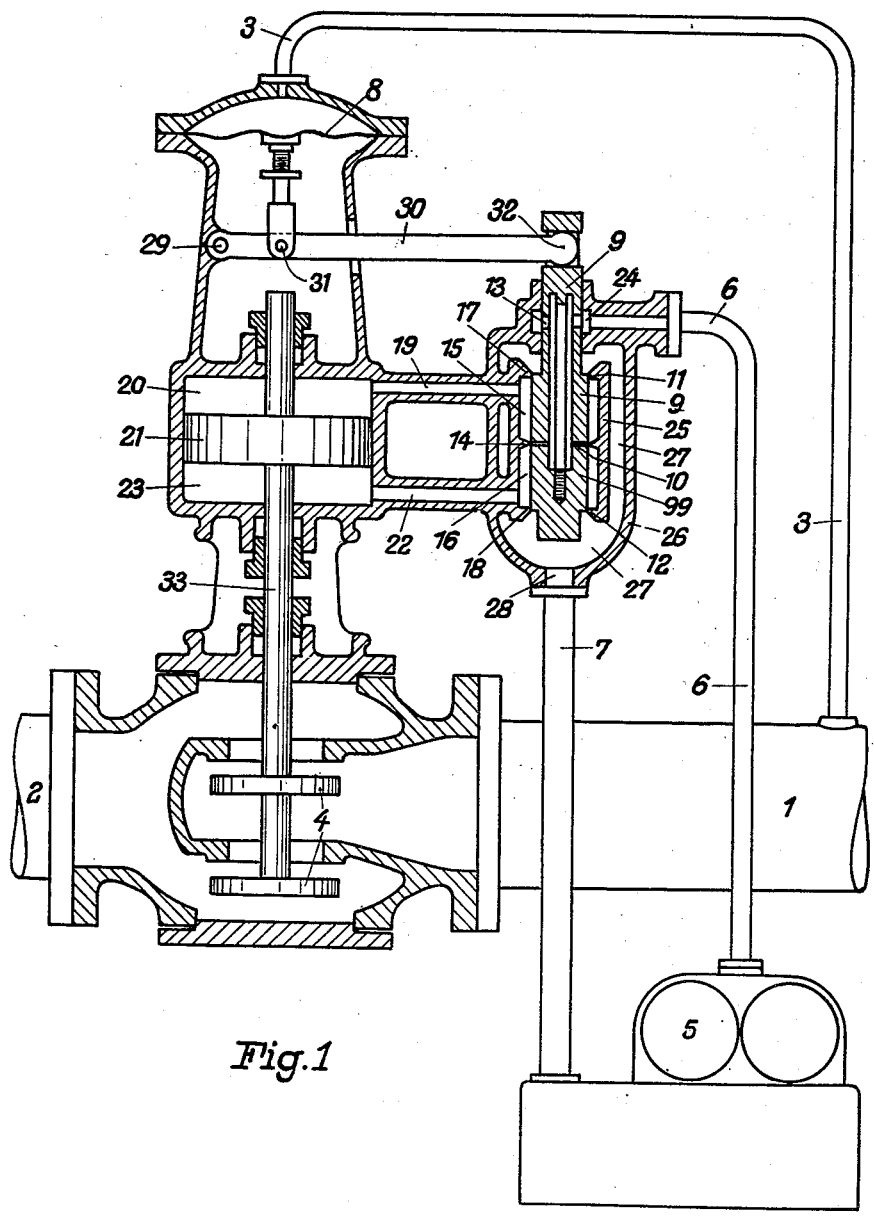

Jan. 8, 1935.  E. EDLER  1,987,505
PRESSURE REGULATOR
Filed April 22, 1932   3 Sheets-Sheet 1

Inventor:
Eduard Edler
By Jones, Addington, Ames & Seibold
Att'ys

Jan. 8, 1935.  E. EDLER  1,987,505
PRESSURE REGULATOR
Filed April 22, 1932  3 Sheets-Sheet 2
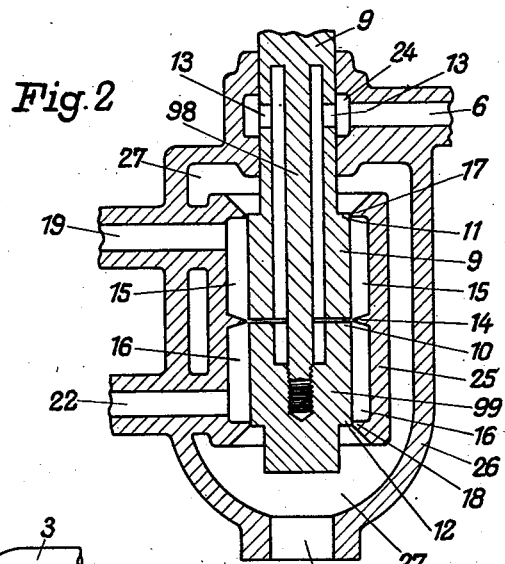
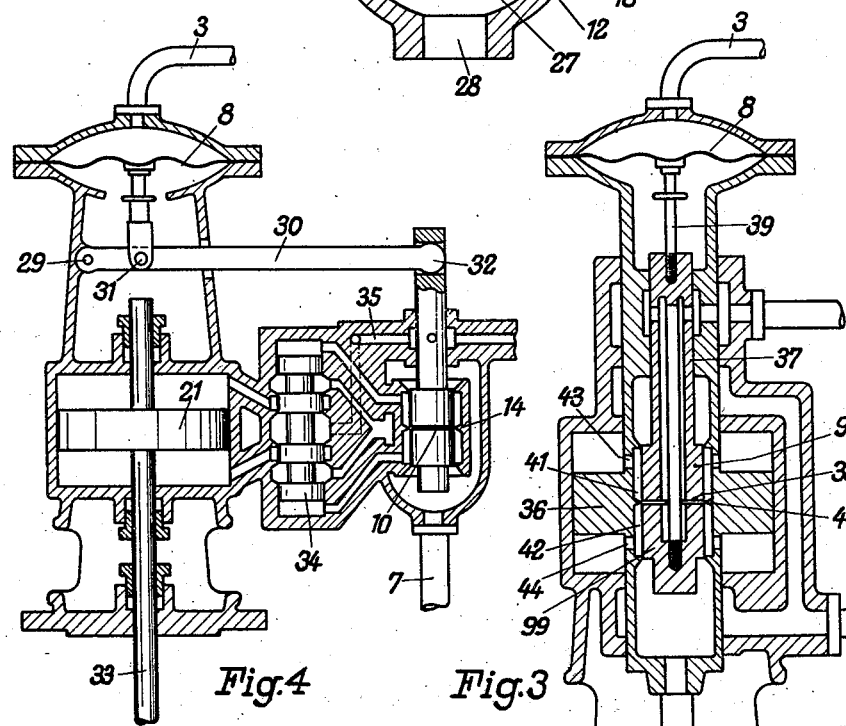
Inventor:
Eduard Edler
By Jones, Addington, Ames & Seibold
Att'ys Patented Jan. 8, 1935

1,987,505

UNITED STATES PATENT OFFICE 1,987,505

PRESSURE REGULATOR

Eduard Edler, Leipzig, Germany, assignor to the firm Schumann & Co., Leipzig, Germany, a corporation of Germany Application April 22, 1932, Serial No. 606,927
In Germany April 30, 1931

(8 Claims. (Cl. 121—38))

If in the case of regulators which are adapted to maintain constant a condition such as for example a pressure, a temperature, a velocity or a quantity, considerable forces are necessary for adjustment, then use is made of a pressure medium such as water, oil, air or the like, which is independent of the regulator or of its operating medium in order to effect the actuation of the regulator. Various types of construction of such regulators are well known. They mostly consist of a relay which receives its impulse from a condition to be maintained constant, as for example pressure, temperature, velocity or the like, and which controls the action of the pressure medium on the regulator. When an operating condition which is to be maintained constant is diminished or becomes excessive an adjustment of the regulator is produced in the direction which is necessary for restoring the desired condition.

The known regulators actuated by a pressure medium are mostly very complicated, consequently expensive in production, and do not always fulfil the requirements required by regulators of this type. A particular defect of these known regulators is that they are not sufficiently sensitive to fluctuations in the condition. The complicacy of the known regulators due to too large a number of co-operating details gives rise to many possibilities of disturbance. The known regulators are also too sensitive to impurities in the circulation of the pressure medium. A further disadvantage of the known regulators resides in the fact that the sensitive actuating members are not withdrawn from unauthorized actuation and are not protected to a sufficient extent against soiling by dust and the like.

The subject of the present invention is a regulator of which the actuating parts are withdrawn from unauthorized actuation and are protected against the action of dust or the like. The actuating parts are of simple construction, inexpensive and can be produced accurately and are substantially less in number so that possibilities of disturbance are excluded and an efficient operation of the regulator is obtained. In this manner considerable sensitiveness to fluctuations of the condition to be maintained constant is obtained.

In the accompanying drawings are illustrated by way of example a few constructions of the new regulator as a pressure regulator for gas, water, steam, air and the like.

Figure 5:
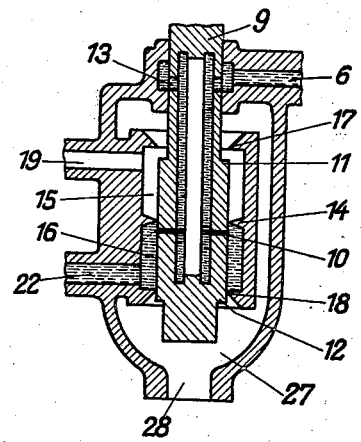
Figure 6:
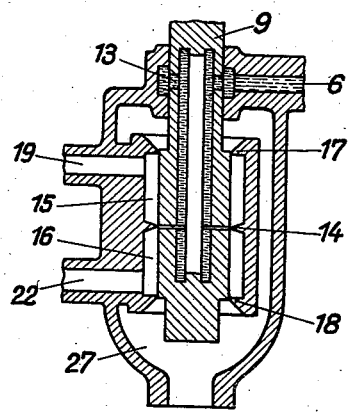
Figure 7:
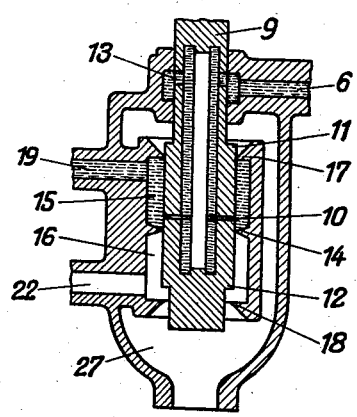

Figure 1 shows a vertical section of the regulator and the provision for the circulation of the pressure medium serving for its actuation. The member, which converts the variations in pressure into movement, for example a diaphragm, acts in this case through the medium of a lever on the actuating member. Figure 2 shows the actuating member on a larger scale. Figure 3 illustrates another example of construction of the regulator in which the movement of the diaphragm is transmitted directly to the actuating device arranged along the spindle axis of the regulator. Figure 4 shows a further example of construction of a regulator for large adjusting forces in which the control member illustrated in Figure 2 serves as the preliminary actuation for the control of a larger power piston. In Figures 5, 6 and 7 are illustrated three different positions of the control member.

There is for example the problem of maintaining constant the pressure in the pipe 1 of Figure 1, for example of water, steam, gas or the like, independently of the pressure in the pipe 2. For this purpose it is already known to allow the pressure to be maintained constant and present in the chamber 1 to act through a pipe 3, branched from the chamber 1, upon a diaphragm 8. Further, it is known for the purpose of adjusting the regulator valve 4 to use a pressure medium, for example water, oil, or air, which is caused to circulate by a pump 5 in that a pipe 6 leads the pressure medium from the pump 5 to a control device and a pipe 7 leads the pressure medium from the control device back to the pump 5.

The problem of so actuating the valve 4 when fluctuations occur in the pressure in the chamber 1 that in the case of an increase in pressure in the chamber 1 the valve 4 approaches its seat and in the case of a reduction in pressure in the chamber 1 it moves away from its seat, is solved according to the present invention in the following manner.

A diaphragm 8 or another member which converts pressure variations into movement acts directly (Figure 3) or indirectly (Figures 1 and 4) on a control piston 9 which for the sake of clearness is shown on an enlarged scale in Figure 2. This control piston is made hollow and consists of an upper part 9 and a lower part 99. These two parts are for example so connected together by a connecting rod 98 (see Fig. 2) screwed into the lower part, that between their adjacent end faces there is formed a narrow annular gap 10 through which there can flow out the pressure medium (for example oil) flowing through the hollow control piston, in the form of a thin plate shaped stream. The control piston is provided at its parts adjacent the annular gap 10 with a larger diameter so as to form edges 11 and 12 which serve as control edges. At the upper end of the control piston are provided bores 13 through which the coil can enter the hollow control piston.

Directly opposite the annular gap 10 there is located a knife edged radial cutter 14 over which the oil flowing out of the annular gap 10 can flow into the chambers 15 and 16 located on both sides of the cutter 14. The chamber 15 is closed towards the top by a control edge 17 and the chamber 16 towards the bottom by a control edge 18. From the chamber 15 a bore 19 leads to a chamber 20 above a power piston 21 (Figure 1) and from the chamber 16 a bore 22 leads to a chamber 23 underneath the power piston 21. At the end of the bores 13 the control piston 9 forms an annular chamber 24 into which leads the pipe 6 for the supply of oil to the control member. The cylinder 25 supporting the annular cutter 14 and the two control edges 17 and 18 is so surrounded by a casing 26 as to form a chamber 27, which at the bottom is provided with an oil outflow 28 leading to the pipe 7.

In the example illustrated in Figure 1 the movement of the diaphragm 8 is transmitted to the control piston 9 by a lever 30 oscillating about the pivot 29. As the distance between the point of engagement 31 of the diaphragm 8 to the lever 30 and the pivot 29 of the lever is smaller than the distance between the control piston 9 connected to the end of the lever 30 and the pivot 29, a small flexing of the diaphragm corresponds to a larger movement of the control piston 9.

The method of operation is as follows:—The oil passes out of the pump 5 through the pipe 6 into the chamber 24 and from here through the bores 13 into the hollow control piston 9. From this the oil passes in a thin plate shaped stream through the annular gap 10 and according to the position of this annular gap 10 to the oppositely disposed annular cutter 14 into the chamber 15 or 16 and from here through the bores 19 and 22 above or below the power piston 21. The normal position corresponding with the condition to be maintained constant is illustrated in Figure 6. The annular gap is accurately opposite the annular cutter 14. The stream of oil is so divided by the annular cutter 14 that a portion of the oil is conducted to the top through the passage 19 into the chamber 20 and an equal portion of the oil is conducted downwardly through the passage 22 into the chamber 23 so that the action of these two partial streams of oil on the upper and lower surfaces of the power piston 21 is balanced and the power piston remains at rest.

An increase in pressure in the pipe 1 and, consequently, also in the pipe 3, produces a downward movement of the diaphragm 8, and consequently, a downward movement of the control piston 9. A stream of oil passing out of the annular gap 10 (Figure 5) impinges upon the lower part of the annular cutter 14 so that the pressure oil now filling the chamber 16 passes through the bore 22 to the lower surface of the power piston 21 and forces this upwardly whereby the regulator spindle 33 is raised and the regulator valve 4 is closed. Any pressure oil which may still be present on the upper side of the pressure piston 21 during this operation flows through the bore 19 into the chamber 15 and from here over the exposed edges 11 and 17 into the hollow chamber 27 and from here into the outflow pipe 7.

If, however, a reduction of pressure has occurred in the pipes 1 or 3, the control parts assume the position illustrated in Figure 7. The diaphragm 8 springs back and thus draws the control piston 9 upwardly. In this case the pressure oil which is passed out of the annular gap 10 passes into the chamber 15 located above the annular cutter 14 and flows through the passage 19 to the upper surface of the power piston 21 so that this is depressed and in this case moves the regulator spindle 33 downwardly whereby the valve 4 is opened. The oil free from pressure in the chamber 23 underneath the pressure piston passes through the bore 22 into the chamber 16 under the annular cutter 14 and from here over the exposed control edges 12 and 18 into the chamber 27 and then into the oil outflow pipe 7.

The described control with the annular gap 10 and annular cutter 14 may, when larger adjusting forces are necessary for the regulator, also be used as the preliminary control for a larger piston. Such an example of construction is illustrated in Figure 4. In this case the oil flowing over the annular cutter 14 passes over or under a control piston 34 which directs the oil supplied thereto through the passage 35 over or under the power piston 21 in the known manner.

In Figure 3 is illustrated a direct control of the power piston 36, whilst a hollow control piston 37 having an annular gap 38 is provided along the axis of the regulator spindle 33. In this manner a very simple construction is obtained of which only a few details are necessary. A control piston 37 is connected by the screw 39 to the diaphragm 8. The screw 39 permits of adjusting the distance between the diaphragm 8 and the annular gap 38. The stream of oil passing out of the annular gap 38 passes, according to the variation in the condition, which has occurred in the pipe 1, over or under the annular cutter 40 into a chamber 41 or 42, and through the bores 43 or 44 directly over or under the power piston 36. The control acts in exactly the same manner as illustrated in Figures 5, 6 and 7 and as above described.

In the present invention it is immaterial whether the annular cutter is stationary and the annular gap in the control piston forming the plate shaped stream is moved, as illustrated in connection with the examples of construction described, or whether the annular cutter is moved relatively to a stationary annular gap. For obtaining a particular controlling operation there may be provided in a control piston two or more annular gaps each forming a plate shaped stream. In the examples of construction described the oil flows out of a hollow control piston through a narrow annular gap in a thin plate shaped stream from inside outwardly. In accordance with the present invention the flow may also be effected in the reverse direction, whilst a stationary or movable cutter located at the axis of the two cylinders forming the annular gap is supplied with oil passing inwardly from the outside.

The annular gap 10 may also be replaced by bores, nozzles or slots provided at the periphery of the cylinder.

I claim:

1. In a mechanism of the character described, a cylinder, a piston head in said cylinder having a stem extending out of the same for connection with a member to be positioned, means for controlling the operation of said piston head comprising a cylinder having a fluid passageway and a radial slot connecting with said passageway, means for admitting operating-fluid into the said passageway, an enlarged cylinder in which said last cylinder is mounted so as to be capable of reciprocating movement therein, an annular knife-edge so positioned that in the inactive condition of said mechanism said knife-edge is positioned directly opposite said slot, and passageways at each side of said knife-edge for connection with the interior of said piston cylinder.

2. In a mechanism of the character described, a cylinder having ports adjacent each end thereof, a piston head in said cylinder having a stem extending out of the same for connection with a member to be positioned, means for controlling the operation of said piston head comprising a cylinder having a fluid passageway and a radial slot connecting with said passageway, means for admitting operating-fluid into said passageway, an enlarged cylinder in which said last cylinder is mounted so as to be capable of reciprocating movement therein, an annular knife-edge so positioned that in the inactive condition of said mechanism said knife edge is positioned directly opposite said slot, and passageways at each side of said knife-edge connecting the interior of said enlarged cylinder with said ports.

3. In a mechanism of the charatcer described, a cylinder having ports adjacent each end thereof, a piston head in said cylinder having a stem extending out of the same for connection with a member to be positioned, means for controlling the operation of said piston head comprising a cylinder having a fluid passageway and a radial slot connecting with said passageway, means for admitting operating-fluid into said passageway, an enlarged cylinder in which said last cylinder is mounted so as to be capable of reciprocating movement therein, an annular knife-edge so positioned that in the inactive condition of said mechanism said knife-edge is positioned directly opposite said slot, said knife-edge and said reciprocating cylinder acting to divide said larger cylinder into two chambers, and passageways connecting each chamber with one of said ports.

4. In a mechanism of the character described, a cylinder having ports adjacent each end thereof, a piston head in said cylinder having a stem extending out of the same for connection with a member to be positioned, means for controlling the operation of said piston head comprising a cylinder having a fluid passageway and a radial slot connecting with said passageway, means for admitting operating fluid into said passageway, an enlarged cylinder in which said last cylinder is mounted so as to be capable of reciprocating movement therein, annular control members at substantially each end of said larger cylinder, an annular knife-edge in said larger cylinder substantially opposite said radial slot which control members, knife-edge and reciprocating cylinder define two separate annular chambers, and passageways connecting said annular chambers with said ports.

5. In a mechanism of the character described, a cylinder having ports adjacent each end thereof, a piston head in said cylinder having a stem extending out of the same for connection with a member to be positioned, means for controlling the operation of said piston head comprising a cylinder having a fluid passageway and a radial slot connecting with said passageway, means for admitting operating-fluid into said passageway, an enlarged cylinder in which said last cylinder is mounted so as to be capable of reciprocating movement therein, said reciprocating cylinder having an enlarged portion adjacent said slot, annular control members at each end of said enlarged cylinder substantially opposite the outer ends of the enlarged portions of said reciprocating cylinder, an annular knife-edge substantially opposite said radial slot which control members, knife-edge and reciprocating cylinder define two separate annular chambers, and passageways connecting said annular chambers with said ports.

6. In a mechanism of the character described, a cylinder having ports adjacent each end thereof, a piston head in said cylinder having a stem extending out of the same for connection with a member to be positioned, means for controlling the operation of said piston head comprising a cylinder having a fluid passageway and a radial slot connecting with said passageway, means for admitting operating-fluid into said passageway, an enlarged cylinder in which said last cylinder is mounted so as to be capable of reciprocating movement therein, said reciprocating cylinder having an enlarged portion adjacent said slot, an annular knife-edge substantially opposite said radial slot, annular control members having an inner diameter substantially the same as the outer diameter of said reciprocating cylinder and engaging the enlarged portion of said reciprocating cylinder substantially at the ends thereof when said first knife-edge is opposite said slot, said control members, knife-edge and reciprocating cylinder serving to define two separate annular chambers, and passageways connecting said annular chambers with said ports.

7. In a mechanism of the character described, a cylinder having ports adjacent each end thereof, a piston head in said cylinder having a stem extending out of the same for connection with a member to be positioned and means for controlling the operation of said piston head comprising a casing, a large hollow cylinder within said casing and spaced therefrom so as to define a passageway, a smaller cylinder within said larger cylinder, said smaller cylinder having a fluid passageway and a radial slot connecting with said passageway, means for admitting operating-fluid into said passageway, said larger cylinder having annular knife-edges at the two ends and substantially the middle thereof, for spacing the smaller cylinder from the walls of said larger cylinder, and passageways connecting the space between said larger and smaller cylinders and said ports.

8. In a mechanism of the character described, a cylinder having ports adjacent each end thereof, a piston head in said cylinder having a stem extending out of the same for connection with a member to be positioned, means for controlling the operation of said piston head comprising two internally bored cylinders of the same diameter so fastened together in annular alignment as to leave a small flat space therebetween, means for admitting operating-fluid to the bore of said cylinders, a larger cylinder within which said internally bored cylinders reciprocate, annular control members at each end of said larger cylinder in sliding contact with the outer walls of said bored cylinders, and a central annular knife-edge in said larger cylinder substantially opposite said flat space between said internally bored cylinders, said control members and knife-edge defining annular spaces capable of conducting fluid emitted from the bore of said cylinders through said flat space, and passageways connecting said annular spaces with said ports.

EDUARD EDLER.